US009022438B2

(12) United States Patent
Mori et al.

(10) Patent No.: US 9,022,438 B2
(45) Date of Patent: May 5, 2015

(54) CAP ASSEMBLY FOR VEHICLE

(75) Inventors: Masatoshi Mori, Columbus, OH (US);
Robert Bator, Marysville, OH (US);
Jason Wendling, Dublin, OH (US);
Benjamin Huttsell, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 211 days.

(21) Appl. No.: 13/618,390

(22) Filed: Sep. 14, 2012

(65) Prior Publication Data
US 2014/0076094 A1 Mar. 20, 2014

(51) Int. Cl.
| E05B 3/00 | (2006.01) |
| E05B 79/20 | (2014.01) |
| E05B 65/10 | (2006.01) |
| F16C 1/10 | (2006.01) |

(52) U.S. Cl.
CPC ......... *E05B 79/20* (2013.01); *Y10T 403/32254* (2015.01); *Y10T 74/20438* (2015.01); *F16C 1/102* (2013.01); *Y10S 292/17* (2013.01); *Y10S 292/38* (2013.01)

(58) Field of Classification Search
USPC ............. 292/80, 81, 87, 256, 336.3, DIG. 17, 292/DIG. 38; 248/65, 68, 70, 73, 74.1, 74.2, 248/74.4
See application file for complete search history.

(56) References Cited

U.S. PATENT DOCUMENTS

| 2,966,697 | A |   | 1/1961  | Mintz |
| 3,103,378 | A | * | 9/1963  | Ahlgren ........................ 292/17 |
| 4,526,057 | A | * | 7/1985  | Mochida et al. ............ 74/502.2 |
| 4,669,688 | A | * | 6/1987  | Itoh et al. ..................... 248/74.2 |
| 4,860,920 | A | * | 8/1989  | Quennessen .................. 220/326 |
| 4,861,081 | A | * | 8/1989  | Satoh ......................... 292/336.3 |
| 4,881,764 | A | * | 11/1989 | Takahashi et al. ............. 292/13 |
| 4,914,781 | A | * | 4/1990  | Sokn et al. ...................... 16/225 |
| 4,942,271 | A | * | 7/1990  | Corsi et al. ..................... 174/101 |
| 4,967,987 | A | * | 11/1990 | Swank ......................... 248/68.1 |
| 5,052,078 | A |   | 10/1991 | Hosoi |
| 5,184,794 | A | * | 2/1993  | Saito ............................ 248/68.1 |
| 5,185,790 | A |   | 2/1993  | Mischneko |
| 5,257,768 | A | * | 11/1993 | Juenemann et al. .......... 248/604 |
| 5,492,379 | A | * | 2/1996  | Staser et al. ................ 292/336.3 |
| 5,553,818 | A | * | 9/1996  | Wild ............................... 248/56 |
| 5,568,906 | A | * | 10/1996 | Hahn et al. ................... 248/74.1 |
| 5,613,655 | A | * | 3/1997  | Marion ........................ 248/68.1 |
| 5,653,411 | A | * | 8/1997  | Picco et al. .................. 248/74.1 |
| 5,887,918 | A | * | 3/1999  | Okada et al. ............... 292/336.3 |
| 5,934,817 | A | * | 8/1999  | Kim et al. ...................... 403/196 |
| 5,967,587 | A |   | 10/1999 | Collet et al. |
| 6,050,619 | A | * | 4/2000  | Arabia et al. ................. 292/216 |
| 6,106,036 | A | * | 8/2000  | Okada et al. ............... 292/336.3 |
| 6,178,845 | B1| * | 1/2001  | Gutschner .................... 74/502.4 |

(Continued)

FOREIGN PATENT DOCUMENTS

GB 2263305 7/1993

*Primary Examiner* — Carlos Lugo
(74) *Attorney, Agent, or Firm* — Rankin, Hill & Clark LLP (57) ABSTRACT

A cap assembly for a vehicle includes a base and a cap pivotally mounted to the base. The base can define a recess for receiving a component therein to be captured by the cap. The cap is moveable between a locked position and an unlocked position. The cap includes a locking feature that maintains the cap in the locked position and urges the cap to the locked position when nearly in the locked position. When the cap is in the locked position, the component is locked within the recess. When the cap is in the unlocked position, the component is removable from the recess.

18 Claims, 7 Drawing Sheets

(56) References Cited

U.S. PATENT DOCUMENTS

| | | |
|---|---|---|
| 6,352,295 B1 | 3/2002 | Leitner |
| 6,682,026 B2 * | 1/2004 | Nagayasu .................. 248/74.2 |
| 6,971,816 B2 * | 12/2005 | Miyagawa et al. ........... 403/397 |
| 6,976,717 B2 * | 12/2005 | Barr et al. .................. 292/336.3 |
| 6,988,752 B2 * | 1/2006 | Belchine et al. ........... 292/336.3 |
| 7,041,903 B2 * | 5/2006 | Odahara et al. .............. 174/659 |
| 7,201,352 B2 * | 4/2007 | Kawai ......................... 248/74.1 |
| 7,387,282 B2 * | 6/2008 | Kovac .......................... 248/74.4 |
| 7,397,655 B2 | 7/2008 | Nakatani et al. |
| 7,475,924 B2 * | 1/2009 | Meyer et al. ............... 292/336.3 |
| 7,661,631 B2 * | 2/2010 | Ibaraki ............................ 248/73 |
| 7,686,353 B2 * | 3/2010 | Lewis et al. ..................... 292/19 |
| 2005/0284989 A1 * | 12/2005 | Mizukoshi ....................... 248/65 |
| 2006/0277718 A1 | 12/2006 | Nelson |
| 2011/0314635 A1 | 12/2011 | Chen |

* cited by examiner

CAP ASSEMBLY FOR VEHICLE

BACKGROUND

Many caps or clips are known that deflect when being inserted and closed with such caps or clips snapping when moving past a ledge or edge to hold a set position for the cap or clip. Some of these caps or clips rotate about a shaft with the purpose of trapping another part or parts. For example, during vehicle assembly, caps can be used to capture an inserted part between the cap and another part the cap secures against. There is sometimes a need to hold open a cap while the parts the cap traps are inserted. However, once set, it can be desirable for the cap to resist movement from its set position. In particular, in a partially set position, the clip or caps do not typically have the necessary retention force to perform their desired function and thus the clips or caps can fail if partially set.

SUMMARY

According to one aspect, a door handle assembly for a vehicle includes a base, a door handle pivotally mounted to the base and a cable assembly operatively connected to the door handle. The cable assembly has a mounting end portion seated within a recess defined in the base. The door handle assembly further includes a cap rotatably connected to the base for securing the mounting end portion within the recess of the base when in a locked state with the mounting end portion seated within the recess of the base. The cap has a locking feature that urges the cap to a locked position corresponding with the locked state.

According to another aspect, the cap assembly for a vehicle door handle assembly includes a base defining a recess, a component received within the recess of the base and a cap pivotally mounted to the base for securing the component within the recess of the base. The cap is moveable between a locked position wherein the component is locked within the recess and an unlocked position wherein the component is removed from the recess. The cap includes a locking feature that maintains the cap in the locked position and urges the cap to the locked position when nearly in the locked position.

According to a further aspect, a cap assembly for a vehicle includes a base and a cap pivotally mounted to the base. The cap is moveable between a locked position and an unlocked position. The cap includes a locking feature that maintains the cap in the locked position and urges the cap to the locked position when nearly in the locked position.

DETAILED DESCRIPTION

Figure 1:
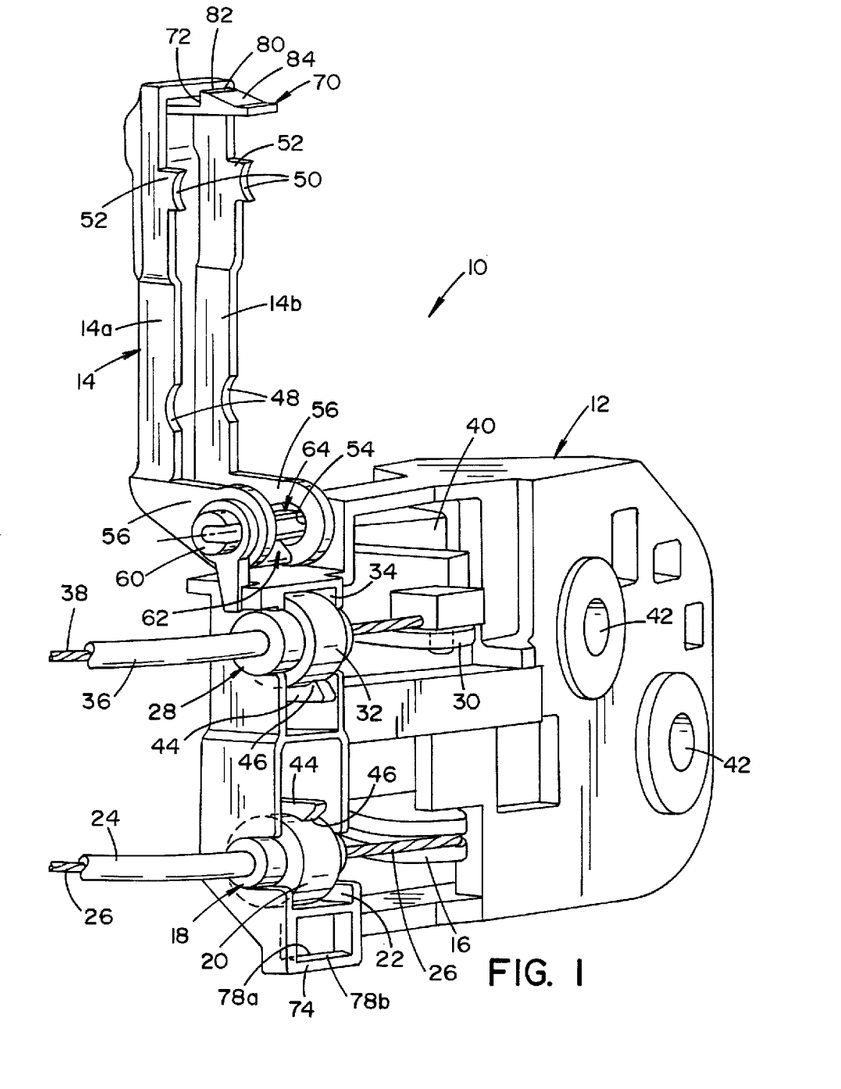
FIG. 1 is a perspective view of a door handle assembly for a vehicle including a base and a cap rotatably connected to the base for securing a component (e.g., a mounting end portion of a cable assembly) within a recess of the base, the cap shown in an unlocked state.
Figure 2:
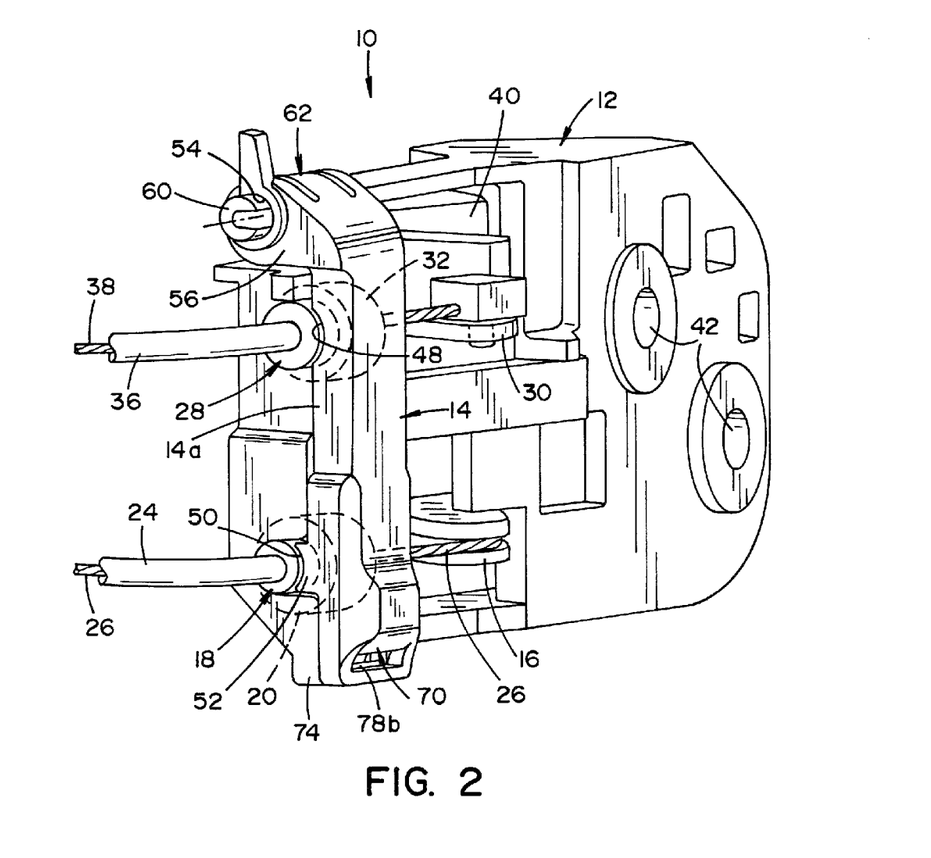
FIG. 2 is a perspective view of the door handle assembly similar to FIG. 1 but showing the cap in a locked state with the component seated within the recess of the base.
Figure 3:
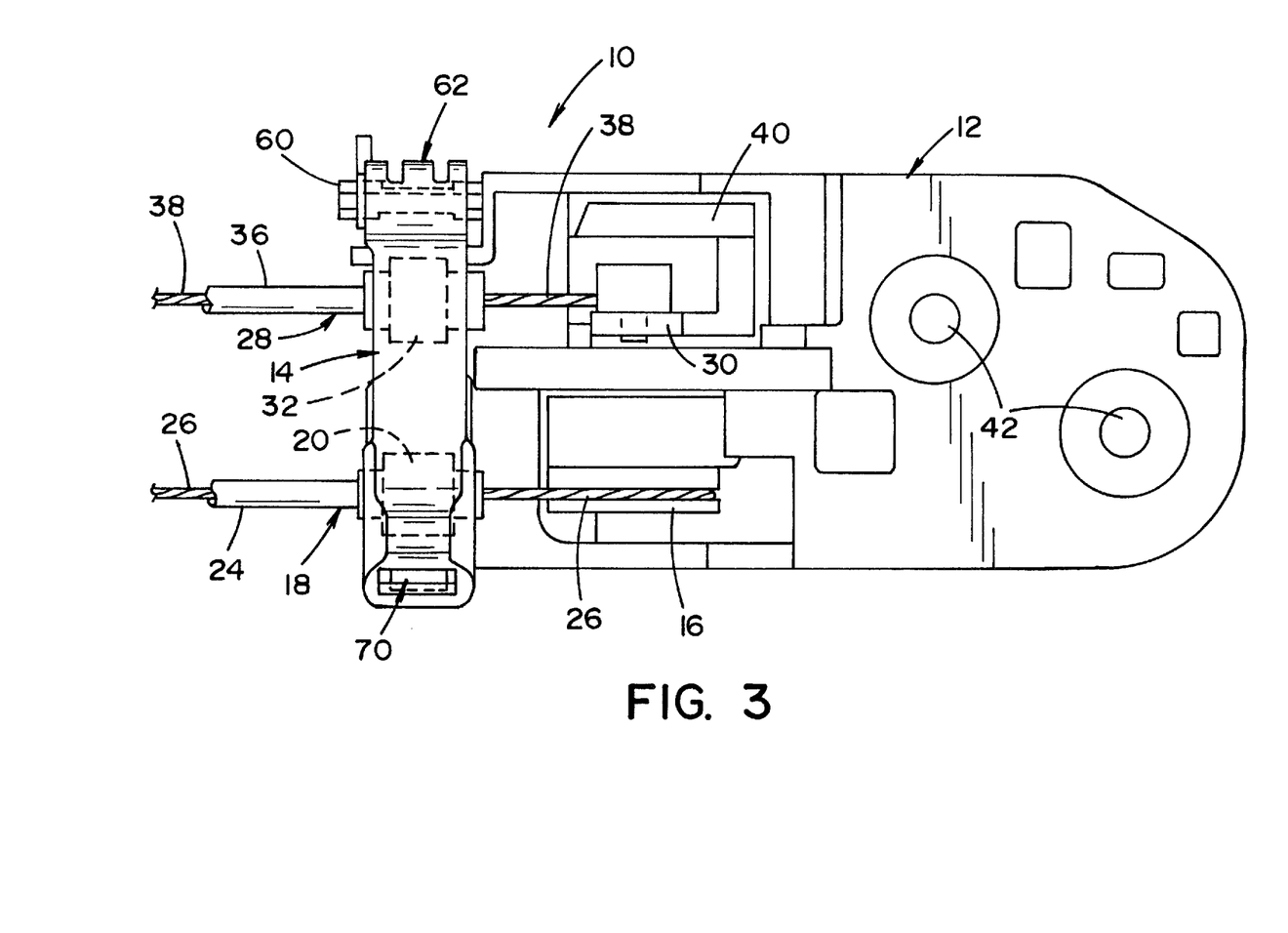
FIG. 3 is a front elevation view of the door handle assembly corresponding to the locked state shown in FIG. 2.

Referring now to the drawings, wherein the showings are for purposes of illustrating one or more exemplary embodiments and not for purposes of limiting same, a cap assembly 10 for a vehicle includes a base 12 and a cap 14 pivotally mounted to the base 12. The cap 14 is moveable between an unlocked position (shown in FIG. 1) and a locked position (shown in FIGS. 2-4). As will be described in more detail below, the cap 14 includes a locking feature that maintains the cap 14 in the locked position and urges the cap 14 to the locked position when nearly in the locked position. As will be described in more detail below, the base 12 can define at least one recess 22 and a vehicle component (e.g., mounting end portion 20 of cable assembly 18) can be received within this recess 22 such that the cap 14 in the locked position can capture the component within the recess 22.

In the illustrated embodiment, the cap assembly 10 is a door handle assembly for a vehicle and includes a door handle or door handle lever 16 pivotally mounted to the base 12 and a cable assembly 18 operatively connected to the door handle 16. The cable assembly 18 has a mounting end portion 20 seated within a recess 22 defined in the base 12. The cap 14 is rotatably connected to the base 12 for securing the mounting end portion 20 within the recess 22 of the base 12 when in a locked state with the mounting end portion 20 seated within the recess 22 of the base 12, wherein the locked position corresponds with the locked state. As shown, the mounting end portion 20 of the cable assembly 18 can be a radially enlarged portion secured to a sheath 24 in which a cable 26 is moveable accommodated. As is known and understood by those skilled in the art, the cable 26 can connect the door handle 16 to a latch assembly that allows a door of the vehicle to be opened (latch assembly and door not shown).

In the illustrated embodiment, the cable assembly 18 is a first cable assembly and the door handle assembly 10 additionally includes a second cable assembly 28 operatively connected to a locking lever or member 30 that is moveably mounted to the base 12. The second cable assembly 28 has a mounting end portion 32 seated within a second recess 34 defined in the base 12 and secured within the second recess 34 when the cap 14 is in the locked state with the mounting end portion 32 of the second cable assembly 28 seated within the second recess 34. Like the first cable assembly 18, the second cable assembly 28 can include a sheath 36 secured to the mounting end portion 32 and a cable 38 moveably accommodated within the sheath 36. As is known and understood by those skilled in the art, the cable 38 can be moved by moving the locking member 30, which itself can be connected to a lock actuator 40 provided for manual manipulation within the vehicle. Movement of the cable 38 can effect a locking or unlocking action with respect to the door latch assembly (again, not shown) associated with the cable 26. For mounting within the vehicle, the base 12 can include mounting apertures 42, which receive fasteners (not shown) for mounting the base 12 within a vehicle.

The recesses 22, 34 defined in the base 12 can be partially defined by resilient mounting tabs 44 including, respectively, barbed portions 46 for resiliently retaining the respective mounting end portions 20, 32 within the recesses 22, 34. Additionally, the cap 14 can include curved abutment surfaces or profiles 48, 50 for complementarily cooperating with the curved profile of the mounting end portions 20, 32. As shown, the curved profiles 48, 50 can be recessed into upright walls 14a, 14b of the cap and/or can be provided on protruding wall portions 52 extending from the walls 14a, 14b.

The cap 14 can include a mounting aperture 54 defined by and through the walls 14a, 14b, and particularly through leg ends 56 of the walls 14a, 14b. The base 12 can include a pivot shaft 60 received in the mounting aperture 54 to pivotally mount the cap 14 to the base 12. In the illustrated embodiment, the locking feature includes a cooperative configuration defined by the cap 14 and the pivot shaft 60 that holds the cap 14 in the locked position until sufficient force is applied to overcome a cooperative locking engagement between the cap 14 and the pivot shaft 60. More specifically and with additional reference to FIGS. 4 and 5, the cooperative configuration defined by the cap 14 and the pivot shaft 60 includes a protuberance 62 defined on the cap 14 and a cam surface 64 defined by the pivot shaft 60. As shown, the protuberance 62 extends radially into the mounting aperture 54 and into contact with the cam surface 64 defined by the pivot shaft 60. In the illustrated embodiment, the protuberance 62 includes an apex portion 62a flanked by tapered portions 62b, 62c. The cap 14 and thus the protuberance 62 can be formed of a plastic material and can be configured such that the protuberance 62 is resiliently urged toward and into contact with the cam surface 64 and is only rotatably along the cam surface 64 when sufficient force is applied to the cap 64 (e.g., manual rotation/manipulation) that overcomes the resilient urging.

Figure 6:
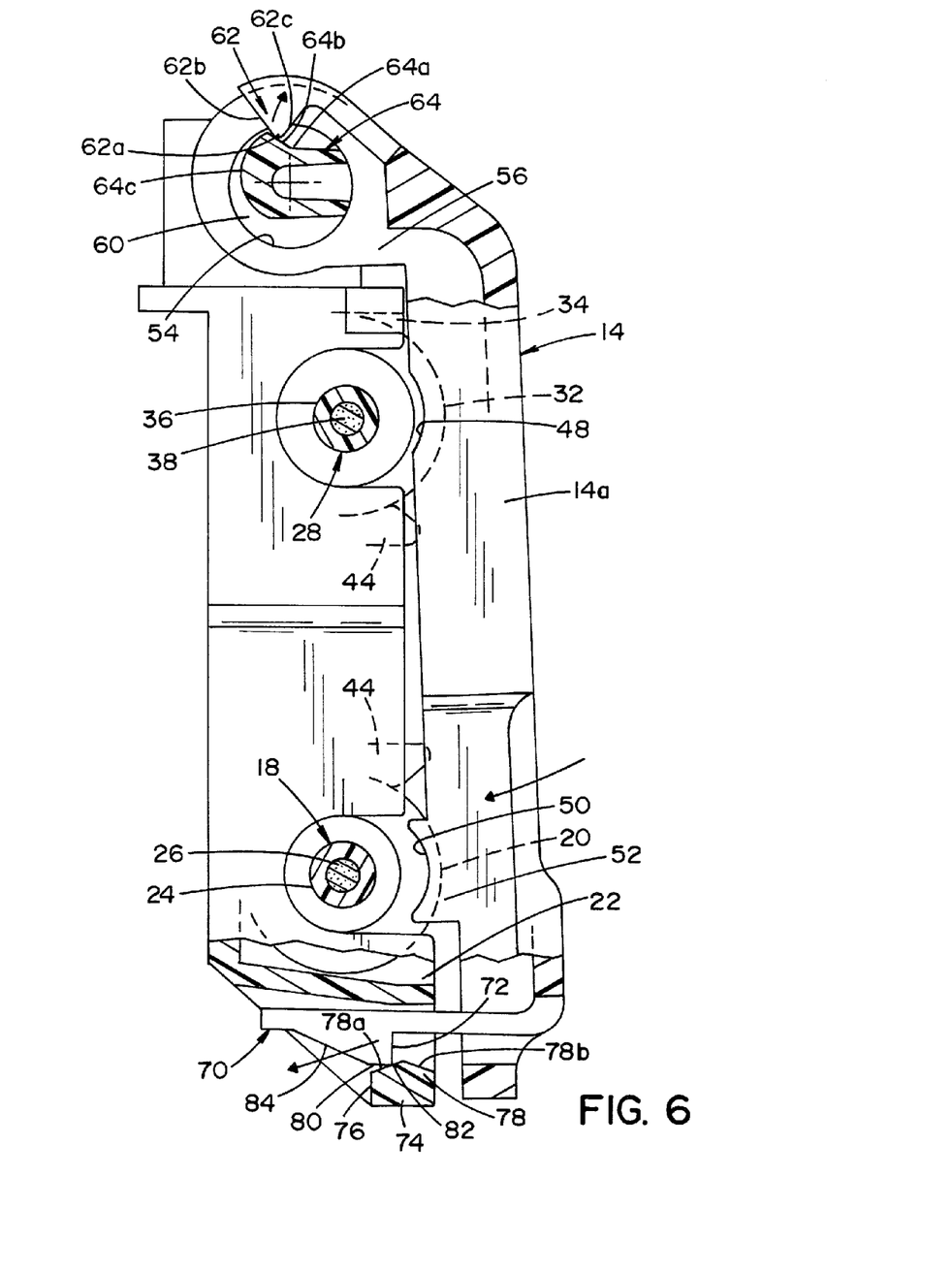
FIG. 6 is a partial cross sectional view of the door handle assembly showing the cap moving toward the locked state.
Figure 7:
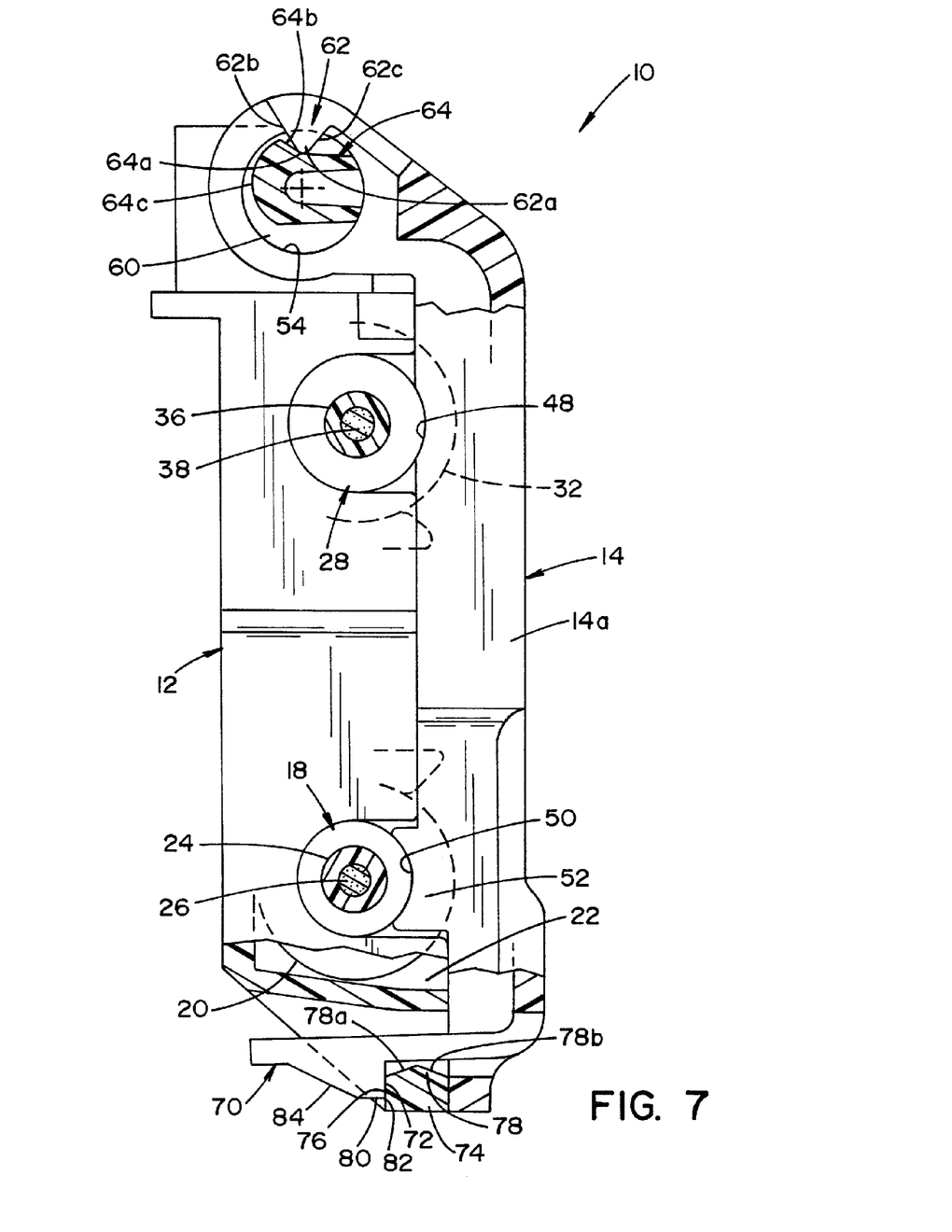
FIG. 7 is a another partial cross sectional view of the door handle assembly similar to FIG. 6 but showing the cap in the locked state.
Figure 8:
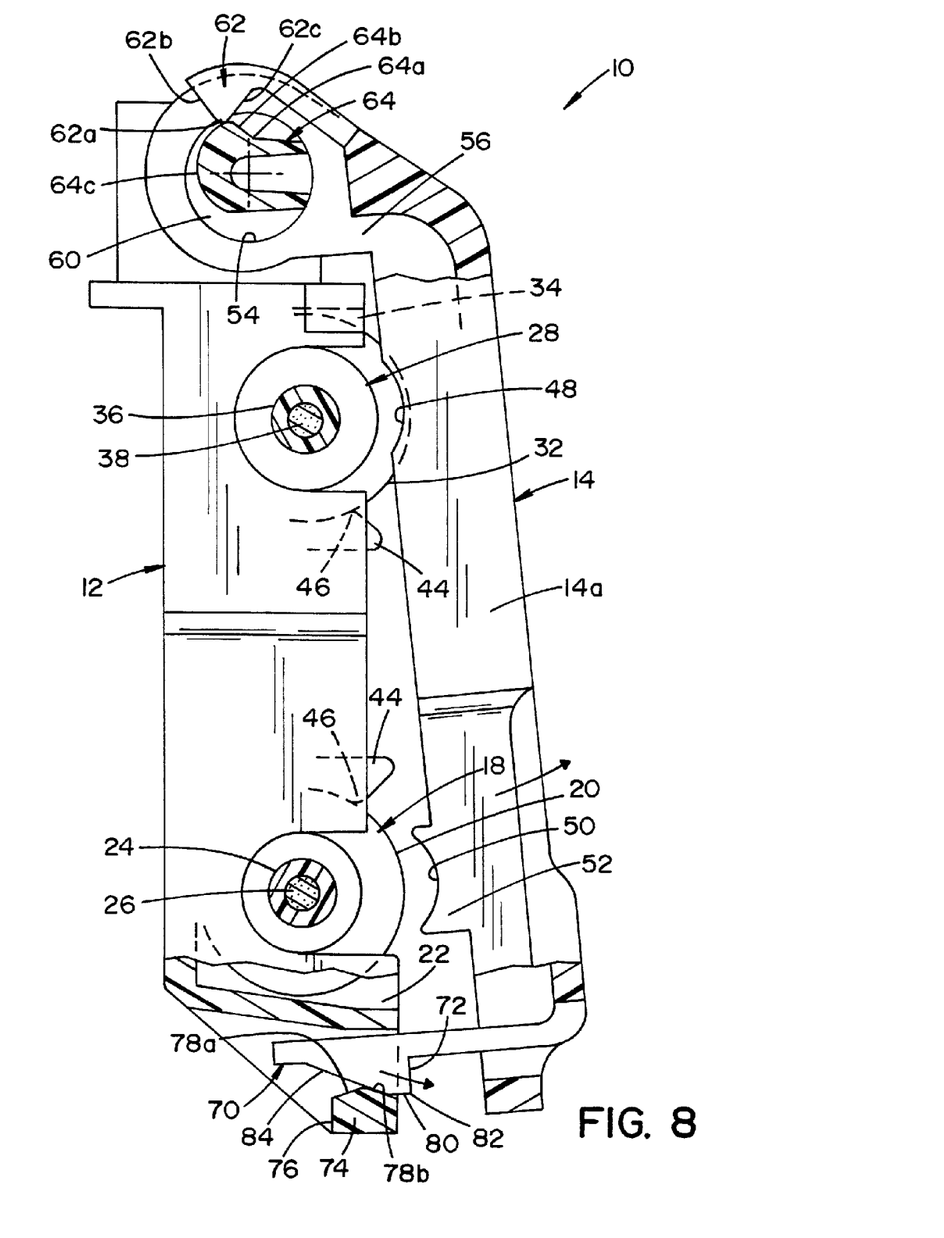
FIG. 8 is still another partial cross sectional view of the door handle assembly similar to FIGS. 6 and 7, but showing the cap in the unlocked state and moving toward the unlocked position.

With additional reference to FIGS. 6-8, the cam surface 64 includes a recess 64a corresponding to the locked position of the cap 14. More particularly, when the protuberance 62 is received within the recess 64a, the cap 14 is in its locked position and locked state. Additionally, the cam surface 64 includes a tapered surface portion 64b interposed between the recess 64a and a curved portion 64c of the cam surface 64. Receipt of the protuberance 62 within the recess 64a is best shown in FIG. 7, which also shows the cap 14 in its locked position and locked state. The tapered portion 64b of the cam surface 64 functions to urge the cap 14 to its locked position corresponding to its locked state and further functions to maintain the cap 14 in its locked position. Additionally, the tapered portion 64b functions to urge the cap to its locked position when the cap 14 is nearly in its locked position, such as is depicted in FIG. 6.

In one embodiment, the locking feature only urges the cap 14 to its locked position when the cap 14 is already in the locked position (FIG. 7) or the cap 14 is near the locked position (FIG. 6). Advantageously, and as best shown in FIG. 8, the locking feature can also urge the cap 14 toward its unlocked position corresponding with the unlocked state for easily visually confirming that the cap 14 is in the unlocked state. In particular, in this role, the locking feature can only urge the cap 14 toward the unlocked position when the cap 14 is a predetermined distance away from the locked position, such as is illustrated in FIG. 8. This predetermined distance away can correspond to when the protuberance 62, and particularly the apex portion 62a thereof, moves off the tapered surface portion 64b and onto the curved portion 64c of the cam surface 64. At this point, the protuberance 62 is urged by the cam surface 64 rotatably away from the recess 64a (i.e., counterclockwise in FIG. 8) and thus away from the locked position.

Figure 4:
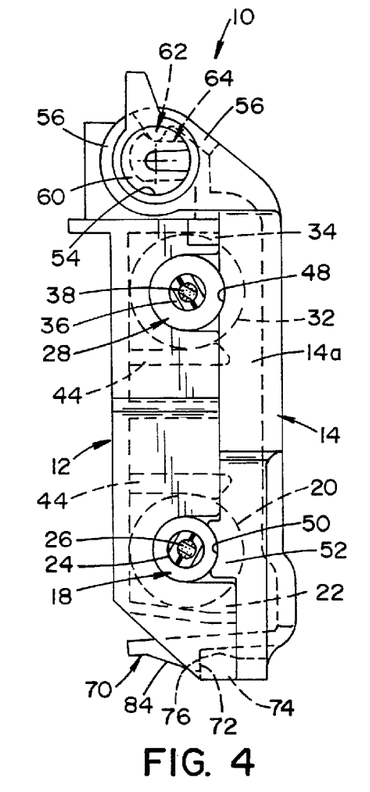
FIG. 4 is an end elevation view of the door handle assembly also corresponding to the locked state shown in FIG. 2.
Figure 5:
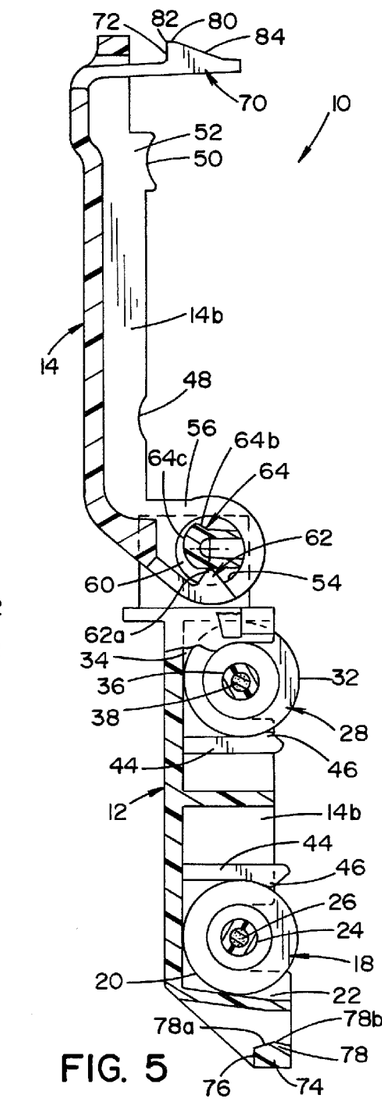
FIG. 5 is another end elevation view, shown partially in cross section, of the door handle assembly corresponding to the unlocked state shown in FIG. 1.

In addition or in the alternative to the locking feature including the above-described cooperative configuration and cooperative locking engagement, the locking feature can also include a second cooperative configuration, this one between a locking tab 70 defined on the cap 14 having a mating surface 72 and a locking shoulder 74 defined on the base 12 having a mating surface 76. As shown in FIGS. 4 and 7, the mating surfaces 72, 76 rest against one another when in cooperative locking engagement to thereby lock the cap 14 in its locked position. In the illustrated embodiment, the locking shoulder 74 includes a double-ramped portion 78 adjacent the mating surface 76 of the locking shoulder 74. A first ramp 78a of the double-ramped portion 78 immediately adjacent the mating surface 76 of the locking shoulder 74 is arranged to urge the locking tab 70 of the cap 14 in a first direction (i.e., to the left in the figures) to move the cap 14 to the locked position. A second ramp 78b of the double-ramped portion 78, which is less adjacent the mating surface 76 of the locking shoulder 74 than the first ramp 78a, is arranged to urge the locking tab 70 of the cap 14 in a second, opposite direction (to the right in FIGS. 4-8) to move the cap 14 away from the locked position and thus toward the unlocked position. As the cap 14 can be formed of plastic, the locking tab 70 can be resiliently urged into contact with the double-ramped portion 78 when passing thereby.

In the illustrated embodiment, the locking tab 70 can include a guide surface 80 oriented approximately orthogonal relative to the mating surface 72 of the locking tab 70, though inclusion of the guide surface 80 is not required. The guide surface 80 and the mating surface 72 of the locking tab 70 together form a corner 82 that engages the double-ramped portion 78 as shown in FIGS. 6 and 8 during pivotal movement of the cap 14 between the locked and unlocked positions. The locking tab 70 can further include a tapered surface 84 adjacent the guide surface 80 on a side opposite the mating surface 72 of the locking tab 70. The tapered surface 82 can have a taper that substantially matches a taper of the second ramp 78b in the illustrated embodiment.

The locking tab 70 and locking shoulder 74 can function to urge the cap 14 to the locked position corresponding with the locked state and can maintain the cap 14 in the locked position. More specifically, the locking tab 70 and locking shoulder 74 can function to urge the cap 14 to the locked position when nearly in the locked position as best illustrated in FIG. 6. Specifically, the first ramp 78a can urge the corner 82 therealong toward the locked position due to the taper of the first ramp 78a. The mating cooperative engagement between the mating surfaces 72, 76 can resist movement of the cap 14 from the locked position shown in FIG. 7. The locking tab 70 and locking shoulder 74 can also function to only urge the cap 14 to the locked position when the cap is already in the locked position (FIG. 7) or the cap 14 is near the locked position (FIG. 6). The locking tab 70 and locking shoulder 74 can additionally urge the cap 14 toward the unlocked position corresponding with an unlocked state for easily visually confirming that the cap 14 is in the unlocked state.

In particular, the locking tab 70 and the locking shoulder 74 can be configured to only urge the cap 14 toward the unlocked position when the cap 14 is a predetermined distance away from the locked position, such as shown in FIG. 8. More specifically, the predetermined distance away can be the point at which the corner 82 passes the apex formed by the first and second ramps 78a, 78b. Beyond this point, the second ramp 78b urges the locking tab 72 away from the locked position and toward the unlocked position. Likewise, engagement between the guide surface 80 and/or the tapered surface 84 of the locking tab 70 with the second ramp 78*b* also urges the cap 14 away from the locked position and toward the unlocked position as shown in FIG. 8.

In the illustrated embodiment, the locking feature includes both the cooperative configuration defined by the cap 14 and the pivot shaft 60, including the cooperative locking engagement between the cap 14 and the pivot shaft 60, and also the cooperative configuration defined by the locking tab 70 and locking shoulder 74. Thus, both cooperative configurations function to maintain the cap in the locked position and to urge the cap 14 to the locked position when nearly in the locked position. Specifically, receipt of the protuberance 62 in the recess 64*a* of the cam surface 64 can correspond to the mating surfaces 72, 76 engaging one another. Likewise, the apex of the protuberance 62 passing the intersection of the curved portion 64*c* and the tapered portion 64*b* can correspond with the corner 82 passing the apex formed by the first and second ramps 78*a*, 78*b*. Additionally, both cooperative configurations can function to maintain the cap 14 in the unlocked position and urge the cap 14 toward the unlocked position when the cap 14 is not in the locked position and is more than a predetermined distance from the locked position. Accordingly, the illustrated embodiment provides an assembly for applying force to hold or move a hinged part (e.g., the cap 14) to a desired position via the shaft 60 it rotates about. Moreover, the cap 14 includes the ability to pull itself shut when close to the closed position. This facilitates the cap 14 being in either the closed position or a readily observable and visually confirmable open position.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A door handle assembly for a vehicle, comprising:
   a base;
   a door handle pivotally mounted to the base;
   a cable assembly operatively connected to the door handle, the cable assembly having a mounting end portion seated within a recess defined in the base; and
   a cap rotatably connected to the base for securing the mounting end portion within the recess of the base when in a locked state with the mounting end portion seated within the recess of the base, the cap having a locking feature that urges the cap to and maintains the cap in a locked position corresponding with the locked state,
   wherein the cap is pivotally mounted to the base via a pivot shaft included on the base, the locking feature including a first cooperative configuration defined by the cap and the pivot shaft which applies a force to the cap that holds the cap in the locked position until sufficient opposing force is applied to overcome a cooperative locking engagement between the cap and the pivot shaft, the locking feature further including a second cooperative configuration defined by a locking tab defined on the cap having a mating surface and a locking shoulder defined on the base having a mating surface, the mating surfaces resting against one another when the cap is in the locked position.

2. The door handle assembly of claim 1 wherein the locking feature only urges the cap to the locked position when the cap is already in the locked position or the cap is near the locked position.

3. The door handle assembly of claim 1 wherein the locking feature also urges the cap toward an unlocked position corresponding with an unlocked state for visually confirming that the cap is in the unlocked state.

4. The door handle assembly of claim 3 wherein the locking feature only urges the cap toward the unlocked position when the cap is a predetermined distance away from the locked position.

5. The door handle assembly of claim 1 wherein the cable assembly is a first cable assembly and the door handle assembly includes a second cable assembly operatively connected to a locking lever that is movably mounted to the base, the second cable assembly having a mounting end portion seated within a second recess defined in the base and secured within the second recess when the cap is in the locked stated with the mounting end position of the second cable assembly seated within the second recess.

6. The door handle assembly of claim 1 wherein the cap includes a mounting aperture and the pivot shaft is received in the mounting aperture to pivotally mount the cap to the base.

7. The door handle assembly of claim 6 wherein the first cooperative configuration includes a protuberance defined on the cap and a cam surface defined by the pivot shaft, the protuberance extends radially into the mounting aperture and into contact with the cam surface defined by the pivot shaft.

8. The door handle assembly of claim 7 wherein the cam surface includes a recess corresponding to the locked position of the cap.

9. The door handle assembly of claim 8 wherein the cam surface includes a tapered surface portion interposed between the recess and a curved portion of the cam surface.

10. The door handle assembly of claim 7 wherein the protuberance includes an apex portion flanked by tapered portions.

11. The door handle assembly of claim 1 wherein the locking shoulder includes a double-ramped portion adjacent the mating surface of the locking shoulder, a first ramp of the double-ramped portion adjacent the locking shoulder is arranged to urge the locking tab of the cap in a first direction to move the cap to the locked position, a second ramp of the double-ramped portion that is less adjacent the mating surface of the locking shoulder than the first ramp is arranged to urge the locking tab of the cap in a second, opposite direction to move the cap away from the locked position.

12. The door handle assembly of claim 11 wherein the locking tab includes guide surface oriented approximately orthogonal relative to the mating surface of the locking tab, the guide surface and the mating surface of the locking tab forming a corner that engages the double-ramped portion during pivotal movement of the cap between the locked and unlocked positions.

13. The door handle assembly of claim 11 wherein the locking tab further includes a tapered surface adjacent the guide surface on a side opposite the mating surface of the locking tab, the tapered surface having a taper that substantially matches a taper of the second ramp.

14. A cap assembly for a vehicle door handle assembly, comprising:
   a base defining a recess;
   a component received within the recess of the base; and
   a cap pivotally mounted to the base for securing the component within the recess of the base, the cap movable between a locked position wherein the component is locked within the recess and an unlocked position wherein the component is removable from the recess, the cap including a locking feature that maintains the cap in the locked position and urges the cap to the locked position when nearly in the locked position, wherein the locking feature includes:

a pivot shaft mounted to the base;

a mounting portion of the cap journaled to the pivot shaft for pivotally mounting the cap to the base;

a cam surface defined by the pivot shaft corresponding to the locked position;

a protuberance extending radially from the mounting portion into engagement with the cam surface;

a locking shoulder defined on the base; and a locking tab defined on the cap, the locking tab engaging the locking shoulder in the locked position.

15. The cap assembly of claim 14 wherein the locking feature further maintains the cap in the unlocked position and urges the cap to the unlocked position when the cap is not in the locked position and is more than a predetermined distance from the locked position.

16. The cap assembly of claim 14 wherein the locking shoulder includes a mating surface and a double-ramped portion projecting from a guide wall of the base oriented approximately perpendicular relative to the mating surface; and the locking cap includes a mating surface, a guide surface oriented approximately perpendicular relative to the mating surface and a tapered surface extending from one end of the guide surface opposite the mating surface.

17. The cap assembly of claim 14 wherein the cam surface includes a tapered portion adjacent the recessed portion, the tapered portion arranged so that the protuberance is urged into the recessed portion and simultaneously the locking tab is urged by a first ramp of the double-ramped portion so that the mating surfaces engage one another thereby urging the cap to the locked position.

18. A cap assembly for a vehicle, comprising:

a base;

a cap pivotally mounted to the base, the cap movable between a locked position and an unlocked position, the cap including a locking feature configured to maintain the cap in the locked position and apply a force to the cap that urges the cap to the locked position when nearly in the locked position, wherein the locking feature includes:

a pivot shaft mounted to the base;

a mounting portion of the cap journaled to the pivot shaft for pivotally mounting the cap to the base;

a cam surface defined by the pivot shaft including a recessed portion corresponding to the locked position;

a protuberance extending radially from the mounting portion into engagement with the cam surface;

a locking shoulder defined by the base, the locking shoulder including a mating surface and a double-ramped portion projecting from a guide wall of the base oriented approximately perpendicular relative to the mating surface; and a locking tab defined by the cap, the locking cap including a mating surface, a guide surface oriented approximately perpendicular relative to the mating surface and a tapered surface extending from one end of the guide surface opposite the mating surface.

* * * * *